(12) United States Patent
Wei et al.

(10) Patent No.: US 8,809,420 B2
(45) Date of Patent: Aug. 19, 2014

(54) METHOD FOR PREPARING ORGANIC-INORGANIC COMPOSITE MATERIALS

(75) Inventors: Wang Wei, Nanjing (CN); Gongping Liu, Nanjing (CN); Nanping Xu, Nanjing (CN); Wanqin Jin, Nanjing (CN)

(73) Assignee: Nanjing University of Technology (CN)

( * ) Notice: Subject to any disclaimer, the term of this patent is extended or adjusted under 35 U.S.C. 154(b) by 24 days.

(21) Appl. No.: 13/521,534

(22) PCT Filed: Feb. 8, 2010

(86) PCT No.: PCT/CN2010/070567
§ 371 (c)(1),
(2), (4) Date: Jul. 11, 2012

(87) PCT Pub. No.: WO2011/094955
PCT Pub. Date: Aug. 11, 2011

(65) Prior Publication Data
US 2012/0302682 A1 Nov. 29, 2012

(51) Int. Cl.
| | |
|---|---|
| *C08K 9/06* | (2006.01) |
| *C09C 1/02* | (2006.01) |
| *C09C 1/36* | (2006.01) |
| *C08L 83/04* | (2006.01) |
| *C09C 1/30* | (2006.01) |
| *C09C 1/42* | (2006.01) |
| *C08J 3/205* | (2006.01) |
| *C09C 1/40* | (2006.01) |
| *C09C 3/00* | (2006.01) |
| *C09C 3/10* | (2006.01) |
| *C08G 77/04* | (2006.01) |

(52) U.S. Cl.
CPC . *C09C 3/10* (2013.01); *C09C 1/028* (2013.01); *C09C 1/3676* (2013.01); *C08L 83/04* (2013.01); *C09C 1/3072* (2013.01); *C08G 77/04* (2013.01); *C01P 2004/03* (2013.01); *C08J 2383/04* (2013.01); *C08K 9/06* (2013.01); *C09C 1/42* (2013.01); *C08J 3/2053* (2013.01); *C09C 1/407* (2013.01); *C09C 3/00* (2013.01)
USPC ........................................................ 523/212

(58) Field of Classification Search
USPC ........................................................ 523/212
See application file for complete search history.

(56) References Cited

U.S. PATENT DOCUMENTS

2008/0241408 A1* 10/2008 Cumberland .............. 427/397.7
2010/0249271 A1  9/2010 Matyjaszewski et al.

FOREIGN PATENT DOCUMENTS

| CN | 101445580 A | 6/2009 |
| CN | 101580570 A | 11/2009 |

OTHER PUBLICATIONS

Fenjuan Xiangli et al. "Optimization of preparationconditions for polydimethylsiloxane (PDMS)/ceramic composite pervaporation membranes using response surface methodology"; Journal of Membrane Science, vol. 311, Issues 1-2, Mar. 20, 2008, pp. 23-33.
Tongjie Yao et al. "Preparation of SiO2@polystyrene©polypyrrole sandwich composites and hollow polypyrrole capsules with movable SiO2 spheres inside"; Journal of Colloid and Interface Science vol. 315, Aug. 13, 2007 pp. 434-438.
International Search Report mailed Nov. 18, 2010; PCT/CN2010/070567; Int'l File Date: Feb. 8, 2010; Nanjing University of Technology et al.; 6 pages.

* cited by examiner

*Primary Examiner* — Kuo-Liang Peng
(74) *Attorney, Agent, or Firm* — Schmeiser, Olsen & Watts LLP

(57) ABSTRACT

A method for preparing organic-inorganic composite materials is provided. It is a dispersion method that the inorganic phase is introduced into the polymer matrix uniformly. The core-shell structure, in which the inorganic materials are core and the organic materials are shell, is formed by first wrapping the inorganic materials with the organic materials in the same reactor. Therefore, the match between the polarity of inorganic phase and the polarity of polymer phase is increased.

13 Claims, 1 Drawing Sheet

METHOD FOR PREPARING ORGANIC-INORGANIC COMPOSITE MATERIALS

TECHNICAL FIELD

This invention is involved in the field of composite materials preparation, which specifically refers to the preparation method of organic-inorganic composite materials that uniformly introduces a kind of inorganic phase into polymer matrix.

BACKGROUND

Currently, in the field of material preparation, organic-inorganic composite materials have been received increasing attention since that they can take the advantages of polymer matrix and inorganic phase, the synergistic effect could greatly improve the integrated performance of the materials. The density of inorganic phase is generally larger than that of polymer matrix, so inorganic phase easily settles down in polymer matrix solution; meanwhile, the surface area of nanometer-level inorganic phase is large, agglomeration is easily happened among nanometer particles. Thus, the key point in the preparation of organic-inorganic composite materials is how to make inorganic phase be uniformly dispersed in polymer matrix.

In terms of tradition method, the dispersivity of inorganic phase is improved mostly by means of ultra-sonic dispersion and high-energy mechanical agitation or the combination of the both. However, these means sometime cannot solve the issue basically that inorganic phase is difficult to dispersed, and the cost for preparing organic-inorganic composite materials is increased. The existing dispersion methods include in-situ position polymerization and in-situ position generation (i.e., inorganic phase is generated in the in-situ position of polymer matrix). The two means are restricted with system, e.g., if polymer system is not available with reactivity, in-situ position polymerization is unsuitable; if inorganic phase cannot be generated in the in-situ position of polymer matrix, in-situ position generation is not applicable. Another common dispersion way is to modify the functions of inorganic phase and to separate inorganic phase, and finally to introduce inorganic phase into the host phase of polymer. This kind of dispersion method increases the procedures of modifying and separating inorganic phase. Therefore, developing a general dispersion method is very significant for preparing organic-inorganic composite materials.

SUMMARY

The purpose of this invention is to solve the issue existing in the above-mentioned technology and to set out a kind of method for preparing organic-inorganic composite materials.

The technical proposal of this invention is that, use polymer to wrap inorganic phase in the same reactor to form a core-shell structure in which the center part is of inorganic core and the outer part is of organic shell, thus increasing the adaptability between the polarities of inorganic phase and polymer matrix. First, use the solvent, which can dissolve polymer, to prewet inorganic phase; secondly, add surface active agent or silane with functional group, so as to promote the interaction between polymer and inorganic phase through strong chemical action (covalent bond) and weak interaction (van der waals force and drainage action, etc) or the synergistic effect of the both; and then, add part of polymer to wrap the inorganic phase. It needs not to separate the inorganic phase with core-shell structure (the conventional dispersion method is to pretreat and to separate inorganic phase, and then, introduce the inorganic phase into polymer solution); instead, directly introduce other components, which participate in forming organic-inorganic composite materials, into a identical reactor and stir it at low speed so as to form a homogeneous-phase solution; and then, after forming process and subsequent treatment, the solution finally forms organic-inorganic composite materials whose inorganic phase is highly dispersed.

Concrete technical proposal of this invention: a kind of method for preparing organic-inorganic composite materials; the concrete steps are as follows:

1) Use solvent to prewet the introduced inorganic material, and stir it uniformly;
2) Add surface active agent or silane with functional group to perform surface modification to introduced inorganic material, and stir it uniformly;
3) And then, add polymer to wrap the modified introduced inorganic material, and stir it uniformly;
4) And then, add solvent and polymer, and stir it to form uniform solution;
5) The organic-inorganic composite material whose introduced inorganic material is highly dispersed is obtained following the formation.

The total addition matter of solvent in above-mentioned steps 1) and 4) shall be based on the matter of the introduced inorganic material and is 3-100 times that of introduced inorganic material, of which the addition quantity of solvent in step 1) accounts for 40%-60% of total addition quantity of solvent.

The total addition matter of polymer in above-mentioned steps 3) and 4) shall be based on the matter of the introduced inorganic material and is 1-100 times that of introduced inorganic material, of which the addition quantity of polymer in step 3) accounts for 10%-60% of total addition quantity of polymer.

The addition matter of the above-mentioned surface active agent or silane with functional group shall be based on the matter of the introduced inorganic material and is 0.1-1 times that of introduced inorganic material.

Preferred step 1) Stirring rate is 150-500 rpm, and stirring duration is 2-8 h; Step 2) Stirring rate is 150-500 rpm, and stirring duration is 4-8 h; Step 3) Stirring rate is 150-500 rpm, and stirring duration is 2-8 h; Step 4) Stirring rate is 150-500 rpm, and stirring duration is 4-8 h.

The polymer described in this invention is of water-soluble polymer or polymer that can be dissolved with organic solvent; the solvent used for water-soluble polymer is water; and the solvent used for organic solvent-soluble polymer is n-heptane, octane, toluene, dimethyl formamide, n-methyl pyrrolidone or dimethyl sulphoxide.

The preferred foregoing water-soluble polymer is of polyvinyl alcohol, polyethylene glycol or chitosan; the foregoing organic solvent-soluble polymer is of polydimethylsiloxane, polyethersulfone or polyvinylidene fluoride.

The above-mentioned introduced inorganic material is inorganic oxide, perovskite powder, zeolite or clay, of which the grain size of introduced inorganic material is 2 nm-30 µm.

The preferred foregoing inorganic oxide is at least one of $SiO_2$, $Al_2O_3$, $TiO_2$, MgO or $ZrO_2$; perovskite powder is of BaCoFeZrO, BaSrCoFeO or LaSrCoFeO; Zeolite is of NaA, NaY, Silicalite-1 or ZSM-5; clay is at least one of montmorillonite or kaolin.

The preferred foregoing surface active agent is of sodium dodecyl benzene sulfonate, dodecyl trimethylammonium chloride, dodecyl polyglycerol ether or dodecyl ammmonium sulphate; and silane is of n-octyltriethoxysilane, dodecyltrimethoxysilane, diethylaminomethyl triethoxy silane, hexadecyltrimethyl silane hexadecyltriethoxysilane or 3-aminopropyl-triethoxysilane.

Favorable Effect:

This invention uses the physical and chemical properties of dispersed organic-inorganic composite materials to provide a kind of dispersion method that is popularly applicable and simple and needs not the assistance of special equipment. This method omits quite a lot of fussy dispersion steps, thus simplifying the dispersion steps of inorganic phase, and reducing the preparation cost of organic-inorganic composite materials, this is vital important to the development of organic-inorganic composite materials and is in favorable to popularize the method in practical industrial applications.

This invention is involved in a kind of method in which inorganic phase is uniformly dispersed in polymer matrix during the preparation of organic-inorganic composite materials; this method is not only suitable for the matched material of organic-inorganic materials in the aspect of polarity (such as hydrophilic polymer and hydrophilic inorganic matter, hydrophobic polymer and hydrophobic inorganic matter), but also suitable for the unmatched material of organic-inorganic materials in the aspect of polarity (hydrophilic polymer and hydrophobic inorganic matter, hydrophobic polymer and hydrophilic inorganic matter).

The preparation of precursor solution of entire organic-inorganic composite material is performed in the same reactor, this avoids fussy process steps: carrying out a complicated surface modification of inorganic phase, separation, flushing and drying and then preparing the precursor solution of organic-inorganic composite material. This method needs not to use ultra-sonic dispersion and high-energy mechanical agitation, and so the energy consumption for preparing organic-inorganic composite material, thus reducing the cost for preparing organic-inorganic composite materials. The core-shell structure, in which the center part is of inorganic core and the outer part is of organic shell, increases the compatibility of inorganic phase in polymer matrix and slowly releases the stress at the interface of inorganic phase and polymer matrix in the subsequent treatment; therefore, the organic-inorganic composite materials whose interface is defect-free and inorganic phase is highly uniformly dispersed.

DESCRIPTION OF EMBODIMENTS

The following is the further detailed description of the invention in combination with implementation examples, but this invention is not limited to these implementation examples.

EXAMPLE 1

Take 1 g of ZSM-5 zeolite with particle size of 300 nm to mix with 60 mL of n-heptane, and stir the mixture at low speed for 2 h; and then, add 0.1 g of n-octyltriethoxysilane and let it react for 2 h; and then, add 0.5 g of polydimethyl-siloxane (PDMS) and stir the mixture at low speed for 8 h; then, add 4.5 g of PDMS polymer and 25 mL of n-heptane and stir at low speed for 4 h, and so the precursor solution of ZSM-5-PDMS composite material that is uniformly dispersed and very stable is obtained. Finally, the highly-dispersed organic-inorganic composite material in which ZSM-5 zeolite is blended with PDMS is obtained by way of wiping film on glass plate.

Comparative Example 1

Take 1 g of ZSM-5 zeolite with particle size of 300 nm to directly mix with 85 mL of n-heptane and 5 g of PDMS polymer, and stir the mixture for 12 h at low speed. The obtained precursor solution of ZSM-5-PDMS composite material is quite unstable, and sedimentation phenomenon is very obvious; with respect to the prepared organic-inorganic composite material in which ZSM-5 zeolite is blended with PDMS, the agglomeration of ZSM-5 zeolite is serious and there is defect inside organic-inorganic composite material.

Figure 1:
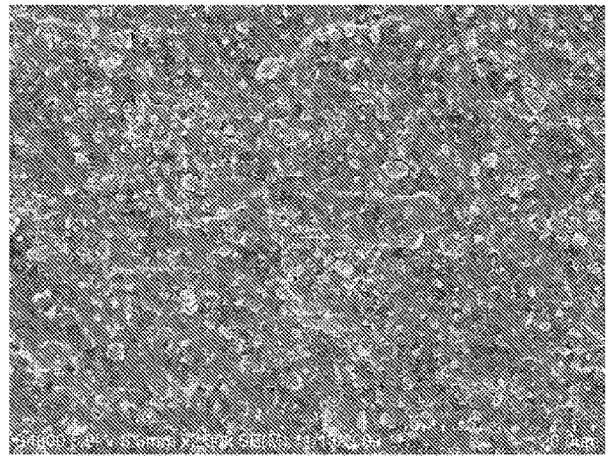
FIG. 1 shows the SEM (scanning electron microscope) images of the fracture of the organic-inorganic composite material that is prepared in example 1.
Figure 2:
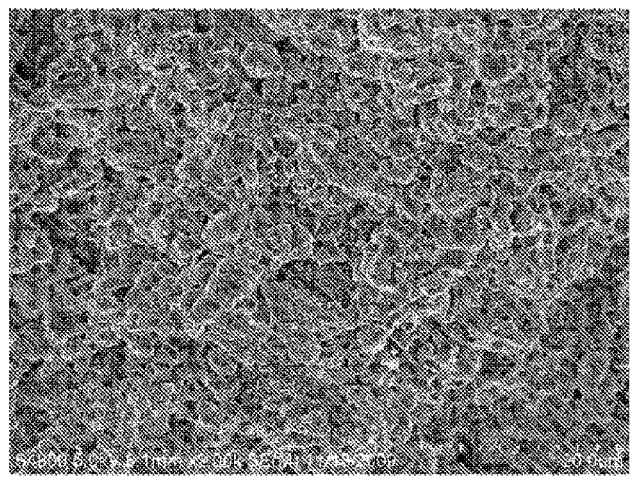
FIG. 2 shows the SEM (scanning electron microscope) images of the fracture of the organic-inorganic composite material that is prepared in comparative example 1.

It can be seen from FIG. 1 and FIG. 2 that, the inorganic phase in which core-shell structure is formed is in favor of the dispersion in polymer matrix.

EXAMPLE 2

Take 0.5 g of NaA zeolite with particle size of 1 μm to mix with 40 mL of deionized water and stir for 3 h at low speed; then, add 0.5 g of 3-aminopropyl-triethoxysilane and let it react for 1 h; then, add 0.5 g of polyvinyl alcohol (PVA), and stir the mixture for 8 h at low speed; and then, add 4.5 g of PVA polymer and 30 mL of deionized water and stir for 4 h at low speed. At this time, the uniformly-dispersed and stable precursor solution of NaA-PVA composite material is obtained. Finally, the highly-dispersed organic-inorganic composite material in which NaA zeolite is blended with PVA is obtained by way of wiping film process.

Comparative Example 2

Take 0.5 g of NaA zeolite with particle size of 1 μm to directly mix with 70 mL of deionized water and 5 g of PVA polymer, and stir for 12 h at low speed. The obtained precursor solution of NaA-PVA composite material is very unstable, and sedimentation phenomenon is very obvious; with respect to the prepared organic-inorganic composite material in which NaA zeolite is blended with PVA, the dispersivity is very poor, and there is obvious defect and crack on the surface.

EXAMPLE 3

Take 5 g of perovskite barium-strontium-cobalt-iron (BSCF) with particle size of 100 nm to mix with 60 mL of dimethyl formamide (DMF), and stir the mixture for 4 h at low speed; then, add 1 g of diethylaminomethyl triethoxy silane and let it react for 1 h; and then, add 0.5 g of polyethersulfone (PES) and stir it for 8 h at low speed; And then, add 4.5 g of PES polymer and 20 mL of DMF, and stir for 4 h. In this way, the precursor solution of BSCF-PES composite material that is uniformly dispersed and very stable is obtained. Finally, the highly-dispersed organic-inorganic composite material in which barium-strontium-cobalt-iron is blended with PES can be obtained by way of extruding and forming.

Comparative Example 3

Take 5 g of perovskite barium-strontium-cobalt-iron (BSCF) with particle size of 100 nm to directly with 80 mL of DMF and 5 g of PES polymer and stir for 12 h at low speed. The obtained precursor solution of BSCF-PES composite material is very unstable, and agglomeration is serious; with respect to the prepared organic-inorganic composite material in which BSCF is blended with PES, the dispersivity is very poor, and surface is very rough, and there are obvious lumps.

EXAMPLE 4

Take 3 g of NaY zeolite with particle size of 500 nm to mix with 60 mL of n-heptane and stir for 6 h at low speed; and then, add 0.2 g of sodium dodecyl benzene sulfonate and let it react for 2 h; and then, add 0.5 g of PDMS polymer and stir for 8 h at low speed; and then, add 4.5 g of PDMS polymer and 20 mL of n-heptane and stir for 4 h at low speed. In this case, the precursor solution of NaY-PDMS composite material that is uniformly dispersed and very stable can be obtained. Finally, highly-dispersed organic-inorganic composite material in which NaY zeolite is blended with PDMS can be obtained by way of inclined casting for film formation.

Comparative Example 4

Take 3 g of NaY zeolite with particle size of 500 nm to directly mix with 80 mL of n-heptane and 5 g of PDMS polymer and stir for 12 h at low speed. The obtained precursor solution of NaY-PDMS composite material is very unstable, and sedimentation phenomenon is very obvious; with respect to the prepared organic-inorganic composite material in which NaY zeolite is blended with PDMS, the dispersivity is very poor, and a great amount of NaY zeolite is accumulated at bottom.

EXAMPLE 5

Take 0.1 g of $SiO_2$ powder with particle size of 10 nm and 0.1 g of silicalite-1 with particle size of 10 nm to mix with 60 mL of n-heptane and stir for 6 h at low speed; and then, add 0.1 g of dodecyl trimethylammonium chloride and let it react for 2 h; and then, add 0.5 g of PDMS polymer and stir or 8 h at low speed; and then, add additional 4.5 g of PDMS polymer and 15 mL of n-heptane and stir for 4 h at low speed. In this case, the precursor solution of $SiO_2$-PDMS composite material that is uniformly dispersed and very stable can be obtained. Finally, highly-dispersed organic-inorganic composite material in which $SiO_2$ is blended with PDMS can be obtained by way of wiping film on glass plate.

Comparative Example 5

Take 0.1 g of $SiO_2$ powder with particle size of 10 nm and 0.1 g of silicalite-1 with particle size of 10 nm to directly mix with 75 mL of n-heptane and 5 g of PDMS polymer and stir for 12 h at low speed. The obtained precursor solution of $SiO_2$-PDMS composite material is very unstable, and sedimentation phenomenon is very obvious; with respect to the prepared organic-inorganic composite material in which $SiO_2$ molecular sieve is blended with PDMS, agglomeration of $SiO_2$ particle is serious.

The invention claimed is:

1. A method for preparing organic-inorganic composite materials comprising:
1) using a first solvent to prewet an introduced inorganic material, and uniformly stirring the introduced inorganic material;
2) adding a surface active agent or silane with a functional group to perform surface modification to the introduced inorganic material, and uniformly stirring the introduced inorganic material;
3) adding a first polymer to wrap the modified introduced inorganic material to form a core-shell structure in which a center part is an inorganic core, and an outer part is an organic shell, uniformly stirring the modified introduced inorganic material; and then
4) adding a second solvent and a second polymer, and uniformly stirring to form a uniform solution.

2. The method for preparing organic-inorganic composite materials according to claim 1, wherein a total addition matter of the first solvent and the second solvent is based on a matter of the introduced inorganic material and is 3-100 times that of the introduced inorganic material.

3. The method for preparing organic-inorganic composite materials according to claim 1, wherein a total addition matter of first polymer and the second polymer is based on the matter of the introduced inorganic material and is 1-100 times that of the introduced inorganic material.

4. The method for preparing organic-inorganic composite materials according to claim 1, wherein an addition matter of the surface active agent or silane with the functional group is based on the matter of the introduced inorganic material.

5. The method for preparing organic-inorganic composite materials according to claim 1, wherein a stirring rate in step 1) is 150-500 rpm, and a stirring duration is 2-8 h; Step 2) Stirring rate is 150-500 rpm, and the stirring duration is 4-8 h; Step 3) Stirring rate is 150-500 rpm, and the stirring duration is 2-8 h; Step 4) Stirring rate is 150-500 rpm, and the stirring duration is 4-8 h.

6. The method for preparing organic-inorganic composite materials according to claim 1, wherein the first polymer and the second polymer is of water-soluble polymer or polymer that can be dissolved with organic solvent; the first solvent and the second solvent used for water-soluble polymer is water; and the first solvent and the second solvent used for organic solvent-soluble polymer is n-heptane, octane, toluene, dimethyl formamide, n-methyl pyrrolidone or dimethyl sulphoxide.

7. The method for preparing organic-inorganic composite materials according to claim 6, wherein the foregoing water-soluble polymer is of polyvinyl alcohol, polyethylene glycol or chitosan; the foregoing organic solvent-soluble polymer is of polydimethylsiloxane, polyethersulfone or polyvinylidene fluoride.

8. The method for preparing organic-inorganic composite materials according to claim 1, wherein the introduced inorganic material is inorganic oxide, perovskite, zeolite or clay, of which the grain size of introduced inorganic material is 2 nm-30 μm.

9. The method for preparing organic-inorganic composite materials according to claim 1, wherein the inorganic oxide is at least one of $SiO_2$, $Al_2O_3$, $TiO_2$, MgO, $ZrO_2$; perovskite is of BaCoFeZrO, BaSrCoFeO or LaSrCoFeO, zeolite is of NaA, NaY, Silicalite-1 or ZSM-5; clay is at least one of montmorillonite or kaolin.

10. The method for preparing organic-inorganic composite materials according to claim 1, wherein the surface active agent is of sodium dodecyl benzene sulfonate, dodecyl trimethylammonium chloride, dodecyl polyglycerol ether or dodecyl ammonium sulphate; and silane is of n-octyltriethoxysilane, dodecyltrimethoxysilane, diethylaminomethyl triethoxy silane, hexadecyltrimethyl silane hexadecyltriethoxysilane or 3-aminopropyl-triethoxysilane.

11. The method of claim 1, wherein the uniform solution is an organic-inorganic composite material.

12. The method of claim 1, wherein the first solvent and the second solvent are at least one of a same solvent and a different solvent.

13. The method of claim 1, wherein the first polymer and the second polymer are at least one of a same polymer and a different polymer.

\* \* \* \* \*

UNITED STATES PATENT AND TRADEMARK OFFICE
CERTIFICATE OF CORRECTION

PATENT NO. : 8,809,420 B2  
APPLICATION NO. : 13/521534  
DATED : August 19, 2014  
INVENTOR(S) : Wei Wang et al.

Page 1 of 1

It is certified that error appears in the above-identified patent and that said Letters Patent is hereby corrected as shown below:

In the Claims

COLUMN 6  
(Claim 9)  
Line 56, after $Z_rO_2$ delete ";" and insert --,--

Line 56, after perovskite delete "is"

Line 57, after zeolite delete "is"

Line 58, after ZSM-5 delete ";" and insert --,--

Line 58, after clay insert --that--

Signed and Sealed this  
Third Day of February, 2015

Michelle K. Lee  
*Deputy Director of the United States Patent and Trademark Office*

UNITED STATES PATENT AND TRADEMARK OFFICE
CERTIFICATE OF CORRECTION

Page 1 of 1

PATENT NO. : 8,809,420 B2
APPLICATION NO. : 13/521534
DATED : August 19, 2014
INVENTOR(S) : Wanqin Jin et al.

It is certified that error appears in the above-identified patent and that said Letters Patent is hereby corrected as shown below:

On the title page item 75 Inventors:

please change "Wang Wei, Nanjing (CN); Gongping Liu, Nanjing (CN); Nanping Xu, Nanjing (CN); Wanqin Jin, Nanjing (CN)"

to read as follows

--Wanqin Jin, Nanjing (CN); Wang Wei, Nanjing (CN); Gongping Liu, Nanjing (CN); Nanping Xu, Nanjing (CN)--

Signed and Sealed this
Second Day of February, 2016

Michelle K. Lee
*Director of the United States Patent and Trademark Office*